(12) United States Patent
Wikeley et al.

(10) Patent No.: US 12,239,131 B2
(45) Date of Patent: Mar. 4, 2025

(54) PLANT GROWTH REGULATOR CONCENTRATE AND USE THEREOF

(71) Applicant: FINE AGROCHEMICALS LIMITED, Whittington (GB)

(72) Inventors: Philip Simon Wikeley, Malvern (GB);
Graham Vaughn Scott, Bristol (GB);
Mark Belville, Portsmouth (GB);
Graham David Seaman, Southampton (GB)

(*) Notice: Subject to any disclaimer, the term of this patent is extended or adjusted under 35 U.S.C. 154(b) by 680 days.

(21) Appl. No.: 17/259,284

(22) PCT Filed: Jul. 11, 2019

(86) PCT No.: PCT/EP2019/068754
§ 371 (c)(1),
(2) Date: Jan. 11, 2021

(87) PCT Pub. No.: WO2020/011950
PCT Pub. Date: Jan. 16, 2020

(65) Prior Publication Data
US 2021/0274782 A1    Sep. 9, 2021

(30) Foreign Application Priority Data

Jul. 11, 2018  (EP) .................................... 18183000

(51) Int. Cl.
| A01N 37/42 | (2006.01) |
| A01N 25/04 | (2006.01) |
| A01N 43/653 | (2006.01) |
| A01N 57/20 | (2006.01) |

(52) U.S. Cl.
CPC ............. *A01N 37/42* (2013.01); *A01N 25/04* (2013.01); *A01N 43/653* (2013.01); *A01N 57/20* (2013.01)

(58) Field of Classification Search
CPC ....... A01N 37/42; A01N 25/04; A01N 43/653
See application file for complete search history.

(56) References Cited

U.S. PATENT DOCUMENTS

2012/0264605 A1   10/2012   Rogers
2013/0252818 A1   11/2013   Lovejoy

FOREIGN PATENT DOCUMENTS

| EP | 0816363 A1 * | 1/1998 | |
| EP | 2839744 A1 | 2/2015 | |
| GB | 2519638 A * | 4/2015 | ............. A01N 25/02 |
| WO | WO-2013113776 A1 * | 8/2013 | ........... C07D 401/12 |

OTHER PUBLICATIONS

Zhou et al. (Synthesis of a Novel Chiral Ionic Liquid and Its Application in Enantioselective Aldol Reactions, Helvetica Chimica Acta, 2008). (Year: 2008).*
Guo et al. (Highly efficient catalyzed by imidazolium-based dual-sulfonic acid functionalized ionic liquids for liquid phase Beckmann rearrangement: experiments and COSMO-RS calculations, Green Chemical Engineering, 2023). (Year: 2023).*
Divya Teja Vavilala et al, "Prohexadione, a plant growth regulator, inhibits histone lysine demethylases and modulates epigenetics", Toxicology Reports, (Jan. 1, 2014), vol. 1, doi:10.1016/j.toxrep.2014.10.026, ISSN 2214-7500, pp. 1152-1161.
Sónia P. M. Ventura et al, "Ionic-Liquid-Mediated Extraction and Separation Processes for Bioactive Compounds: Past, Present, and Future Trends", Chemical Reviews, US, (Feb. 2, 2017),vol. 117, No. 10, doi:10.1021/acs.chemrev.6b00550, ISSN 0009-2665, pp. 6984-7052.
Tadeusz Praczyk, "Ionic liquids based on 2-chloroethyltrimethylammonium chloride (CCC) as plant growth regulators", Cent. Eur. J. Chem., (Jan. 1, 2013), vol. 11, pp. 1816-1821.
Avat Shekoofa et al, "Plant Growth Regulator (Ethephon) Alters Maize (*Zea mays* L.)Growth, Water Use and Grain Yield under Water Stress", Journal of Agronomy, (Jan. 1, 2008), vol. 7, No. 1, doi:10.3923/ja.2008.41.48, ISSN 1812-5379, pp. 41-48.
Yangrui Li et al, "Ethephon : A versatile growth regulator for sugar cane industry", Sugar Tech, New Delhi, (Dec. 1, 2003), vol. 5, No. 4, doi:10.1007/BF02942476, ISSN 0972-1525, pp. 213-223.

* cited by examiner

*Primary Examiner* — Andrew S Rosenthal
*Assistant Examiner* — Danielle Kim
(74) *Attorney, Agent, or Firm* — David P. Owen; HOYNG ROKH MONEGIER B.V.

(57) ABSTRACT

The invention relates to a liquid concentrate comprising a plant growth regulator like prohexadione dissolved in an ionic liquid, the ionic liquid comprising an organic base and a strong acid. The ionic liquid may comprise an amine, amide, imine, imide or urea. The strong acid preferably is ethephon.

18 Claims, No Drawings

PLANT GROWTH REGULATOR CONCENTRATE AND USE THEREOF

FIELD OF THE INVENTION

The invention relates to a plant growth regulator concentrate for agriculture. Furthermore, the invention relates to use of said plant growth regulator concentrate in crops, preferably broad acre crops like cereal crops.

BACKGROUND OF THE INVENTION

In many horticultural and agricultural applications, plant growth regulators (PGRs, growth inhibitors or growth stimulants) are applied for a variety of reasons. For example, it can be useful to increase the speed of growth, increase root formation, seedling setting and the like. It may also be useful to reduce growth in order to have short stems in grain culturing, reduce seed formation in citrus fruits and the like.

Such plant growth regulators are generally considered to comprise plant hormones, chemical compounds that act like plant hormones, and chemical compounds that inhibit the effect of plant hormones (or inhibit the natural production of plant hormones in a plant and in this way reduce the effect of plant hormones).

Many of the PGRs are applied on a crop by spraying the PGR in a diluted solution in water.

Generally, the farmer appreciates liquid concentrated formulations that can easily be admixed with water to result in homogeneous mixtures without additional process steps. Often, a farmer wants to apply several active compounds in one spray run, for example combining a PGR with insecticides, acaricides, fungicides, herbicides and the like, and/or wants to combine the PGR with additives that allow better uptake in the plant, pH control or other attributes. These other active compounds are preferably also supplied as concentrated liquids.

In practice, the concentrate needs to be storage stable for at least two years. In a first year the concentrate may be bought by a farmer, but in the end it may not be necessary to use the product at all, or only in part. Hence, a farmer requires that the concentrate can be used easily the next year as well.

Providing a liquid concentrate is quite easy in case the active substance is water soluble and stable in water, as a concentrated solution of the active substance in water is supplied. In a number of cases this is not possible, because a water-soluble active substance may be not sufficiently stable and/or may be not sufficiently water soluble.

A number of active substances are sparingly soluble in water, or unstable, and therefore are supplied in a number of other ways, including a concentrated solution in an organic solvent suitable for dissolving said active, which solvent is miscible with water like ethanol or propanol. Another option is to prepare a dispersion in water, as such dispersion is most easily mixed with water before spraying. A prerequisite for such dispersion in water is, that the active is stable in water.

In other cases, it appears difficult to combine one active with another in the same concentrate, or one active with appropriate additives.

Also, more complicated systems are developed, like fastly disintegrating granules, dispersions of oily liquids in watery liquids, dispersions of solids in organic liquids and the like. However, it becomes increasingly difficult to predict whether certain formulations may be suitable for certain actives. Examples of formulations are disclosed in WO2012/108873, WO2012/167322, WO2011/012495, WO2005/084435 (US2007/281860), WO2002/035932, WO2001/62080, U.S. Pat. No. 6,458,746, EP2225940 and WO2001/093679.

In a number of cases, concentrates with relatively low amount of active are deemed acceptable by the farmer. In other cases, it is accepted that farmers need to assure that solids are sufficiently well dissolved, or mixed, in order to apply an active equally over the crop in a complete spraying run.

The present inventors were interested to develop useful concentrates for the plant growth regulator prohexadione alone or in combination with other PGRs, other active compounds with fungicidal, insecticidal or other activity, and/or appropriate additives.

Prohexadione, generally used as calcium salt, is scarcely soluble and in particular is unstable in water. Further, the solubility of this PGRs is very limited in many organic compounds like oils.

Prohexadione can be supplied as granules, as for example described in WO2011/012495, or as dispersion concentrate, as for example described in WO2015/024995.

SUMMARY OF THE INVENTION

It is an object of the invention to provide a plant growth regulator (PGR) concentrate of prohexadione without the disadvantages of concentrates according to the prior art, furthermore allowing concentrates to contain at least one further active or additive dissolved in the concentrate.

Furthermore, it is an object of the invention to provide a plant growth regulator concentrate having the advantages of an ionic liquid formulation.

Furthermore, it is an object of the invention to provide methods of using said growth regulator concentrate to treat plants, preferably broad acre crops.

One or more of these objects of the invention is achieved by providing a liquid concentrate comprising dissolved prohexadione in an ionic liquid, the ionic liquid comprising an organic base and a strong acid.

One or more of these objects of the invention is furthermore achieved by providing a liquid concentrate comprising one or more dissolved plant growth regulators in an ionic liquid, the ionic liquid comprising an organic base and a strong acid, wherein said organic base is an amide, imide or urea and the molar ratio of acid to base is between about 1:2 to about 1:10.

The concentrates according the invention are suitable to be diluted in water, in order to be able to spray the active compound on plants. Hence, the present invention also relates to a water based spraying liquid for spraying plants, wherein the liquid comprises water and a suitable amount of one of the concentrates described in the preceding paragraph. Generally, about 50 mL or more, preferably about 500 mL or more up to about 20 L or less of said concentrate is used per hectare. Generally, the concentrate is diluted to an amount of about 50 L or more up to about 2500 L or less per hectare.

The invention furthermore relates to a method for treating plants with at least prohexadione as plant growth regulator, wherein the above described water based spraying liquid is sprayed on plants in an amount such that the effective amount of concentrate is about 50 mL or more, preferably about 500 mL or more up to about 20 L or less of said concentrate per hectare. The spray solution made by dilution of the product will generally be sprayed at a volume of about 50 to about 2500 L/ha.

It is a distinct advantage of the concentrate of the present invention that relatively high concentrated liquid formulations can be provided to farmers, which is easily dispersible in water, because the starting concentrate of prohexadione is a solution.

It was unexpected that prohexadione was stable in solution in the ionic liquid.

A preferred strong acid is ethephon, because this is an active compound by itself, releasing ethylene, and thereby exerting plant growth regulatory activity.

Because of the ionic liquid character of the solvent system, the concentrate may comprise two or more active substances to be present in dissolved form. As the ionic liquid has a strong dissolving power, many active compounds can be provided in a dissolved form that otherwise need to be dispersed, or are incompatible.

It was unexpected that the ionic liquid comprising an organic base and a strong acid, wherein said organic base is an amide, imide or urea and having the molar ratio of acid to base as defined showed such strong dissolving power for a variety of plant growth regulators.

DETAILED DESCRIPTION OF THE INVENTION

The prohexadione plant growth regulator is soluble in the ionic liquid, and/or is part of the ionic liquid. Although prohexadione is relatively unstable, in particular in water, the compound unexpectedly appears to be stable in ionic liquids.

Solubility and stability of the compounds in water is generally known for the registered compounds. The present invention is particularly useful for those compounds that are unstable in water. Unexpectedly, some water did not cause instability of the prohexadione.

Preferably, the concentrate is water free, such as that the amount of water in the concentrate is about 1 wt % or lower, preferably 0.5 wt % or lower, and even more preferably 0.1 wt % or lower. Most preferred is 0.02 wt % or lower.

In one embodiment, prohexadione is combined with one or more of gibberellins, S-ABA, auxins, ethylene inhibitors, or chlormequat or mepiquat chloride, certain triazole or triazole like compounds, daminozide, trinexapac ethyl type compounds. Some of these PGRs are ionic compounds such as chlormequat chloride, and these may therefore aid in obtaining an ionic liquid.

The ionic liquid is an organic solvent system, generally with little or no water, comprising ionic compounds. The compositions may comprise strong acids and an organic base, like an amine, imine or an amide. Ionic liquids are also called deep eutectic liquids. Ionic liquids can also comprise quaternary nitrogen compounds, phosphonium compounds and the like.

Preferred ionic liquids are protonated nitrogen compounds, i.e. the result of acid-base reactions. These are preferred because of simple synthesis, and the reversibility of the acid-base reaction when the concentrate is diluted in water.

Ionic liquids are known as such, and are for example described in U.S. Pat. No. 8,802,596.

The ionic liquid character can for example be measured by the ability to be electrically conductive, or by measuring the $^{13}C$ chemical shift of the carbons attached to the protonated nitrogen relative to an appropriate reference. A further example of measuring the ionic liquid character is by measuring the $^{1}H$ chemical shift of the acidic hydrogen on the acid and the hydrogens near the protonated nitrogen on the organic base.

Preferably, the organic base carrier is an amine, imine, amide, imide or urea.

The organic base preferably has a molecular weight between 60 and 500 d, preferably 80 and 300 d.

More preferably, the base is a tertiary amide, imide or urea.

Suitable organic amide bases include dimethylformamide, diethylformamide, di-isopropyl formamide, dimethyl acetamide, dimethyl propionamide, diethyl propionamide, N,N-dimethylbenzamide, the N,N-dimethylamide of lactic acid (available for example as Agnique AMD 3L), N,N-dimethyl decamide (a C10 amide, available for example as Agnique AMD 10); N,N-dimethyl dodecamine (a C12 amide, available for example as Agnique AMD 12); N,N-dimethyl octamide (a C8 amide, which is together with a C10 amide available as Jeffsol AG1730); N-butylpyrrolidone (available for example as Genagen NBP); methyl-5-(dimethylamino)-2-methyl oxopentanoate (available for example as Rhodiasolve Polarclean), N-methylpyrrolidone, pyrrolidon, N-hydroxyethyl-pyrrolidone, butyrolactam, N-methyl-butyrolactam, N-methyl-caprolactam or caprolactam. Further examples of organic bases include N-octyl pyrrolidone (available for example as Ashland Surfadone); N,N-dimethyl propenamide; N,N-diethyl acetamide; N,N-dimethyl-3-methoxypropanamide; N,N-dimethyl-3-butoxypropanamide; N,N-dimethyl-2-methylpropanamide; 1,3-dimethyl-2-imidazolidinone; N-acyl morpholine; N,N-diethyldodecamide; tetramethyl urea; N,N-dimethylpropylene urea; 2-pyrrolidinone; 2-piperidone and N-ethylacetamide.

Suitable organic aminoalcohols include tris-hydroxyethyl amine; di-hydroxyethyl amine, di-hydroxyethyl-methyl amine, tris-2-hydroxypropanol amine, ethoxylated trishydroxyethyl amine, tris(2-(2-methoxyethoxy)ethyl)amine (TDA-1).

Suitable imine compounds comprise imidazole, N-methyl imidazole or other substituted imidazolines, for example substituted with lower alkyl (C6 or smaller).

Most preferred organic base are tertiary amide compounds.

Preferably, the acid is an organic or inorganic strong acid, which is suitable to form a ionic liquid with the organic base.

Generally, the strong acid has a pH lower than 4, preferably lower than 3, and more preferably lower than about 2.5, and even more preferably lower than about 2.2.

Suitable organic strong acids comprise compounds with a phosphonic acid group, sulfonic acid group, or carboxylic acid group. Also, lactic acid with a pKa of 3.8 is able to provide ionic liquids with amide organic bases, but it is thought that the formation of the ionic liquid is aided by the presence of a hydroxyl group.

Suitable examples of organic strong acids include oxalic acid, ethephon (2-chloroethylphosphonic acid), para-toluene-sulfonic acid, trifluroacetic acid and mixtures thereof. Further examples of organic strong acids include camphor sulfonic acid, dibutyl phosphate, (1-hydroxyethane-1,1-diyl) bis(phosphonic acid) and 2-hydroxyethyl sulphonic acid.

Suitable examples of inorganic strong acids are phosphoric acid, nitric acid, or sulphuric acid. Further examples of inorganic strong acids include hydrochloric acid and tetrafluoroboric acid.

The molar ratio of acid to amide may generally be chosen between about 2:1 and 1:10, preferably 1:1 to 1:8, more preferably 1:4 to 1:8. The molar ratio of acid to amide may generally be chosen between about 2:1 to 1:5, preferably between about 1:1 and 1:3, hence, preferably the base is used in excess on a molar basis relative to the acid. The molar base is the equivalent strong acid groups and the molar amount of basic groups.

The organic base and/or the ionic liquid may also serve as a solvent for further compounds, like additives or other active substances such as PGRs, fungicides, herbicides, insecticides, acaricides or the like. The ionic liquid has a strong dissolving power.

The concentrate further may comprise an emulsifier which aids in stabilizing the water miscibility and self-emulsifying properties when diluted in a suitable dilution in water.

A suitable dilution is the dilution in which the concentrate will be used in practice. For testing purposes, it may be adequate to use for example a 1:50 dilution or higher dilution like 1:100.

The self-emulsifying or -dissolving property of the liquid concentrate can be tested by adding a suitable amount of concentrate in water. For example, one could add 1 wt % of concentrate to water, and invert the vessel with the mixture a few times (i.e., turning the vessel upside down). Generally, a stable emulsion should have been formed when 8 times turning the vessel upside down, or less. Preferably, the concentrate is emulsified in water with inverting the vessel 4 times or less, preferably about two times or less. The precise structure of the emulsion in water is not so important, as long as the at least one active ingredient is well dispersed, emulsified or dissolved, and the mixture is stable. Generally, the solvent dissolves in water.

The at least one active may be dispersed, emulsified or dissolved in the water phase by diluting the concentrate with water.

An emulsifier may be added to improve the emulsification of the liquid concentrate.

The emulsifier may also act as an adjuvant, for example, promoting wetting of the leaf surface or the uptake of the active ingredient into the plant. Generally, an emulsifier may not be necessary if the concentrate components are water miscible.

Preferably, the concentrate comprises an adjuvant.

The concentrate according the invention comprises prohexadione as the growth regulator.

The present invention allows concentrates to have a concentration of the prohexadione of about 3 wt % or more, preferably 4 wt % or more, preferably of about 5 wt % or more such as for example between e.g, 5 and 25 wt %, preferably about 10 wt % or less, like for example 5 wt %, about 4 wt % or about 8 wt %.

Prohexadione can be used as free base or ester, but is generally used as salt. A preferred salt is prohexadione-calcium. A prohexadione salt like the preferred prohexadione Ca preferably is present in an amount of about 4 wt % or more, preferably about 5 wt % or more. Generally, the amount will be about 25 wt % or less, preferably about 20 wt % or less. Suitable amounts include about 10 wt % or less, like for example about 8 wt % or less. Suitable amounts include about 4 wt %, about 5 wt %, about 6 wt % and about 7 wt % of prohexadione salt, preferably the calcium salt.

The concentrate according the invention, if the composition comprises prohexadione Ca salt as the growth regulator, preferably comprises additionally an organic ammonium compound, such as for example ammonium propionate, ammonium decanate, ammonium formate, or ammonium acetate. The ammonium sequestrates the calcium ion, which otherwise may hamper the uptake of the growth regulator by the plant. A cationic emulsifier and/or the solvent, such as those described above, can also be used as ammonium compound. Further, the organic base of the ionic liquid may sequestrate the calcium ion.

Prohexadione is considered hydrolytically unstable, which means that formulations comprising prohexadione do not meet the shelf life requirements of 2 years storage, if they are kept in water.

The concentrate according to the present invention may further comprise additional plant growth regulators. Preferred additional growth regulators include one or more of gibberellins, gibberellin derivatives, S-ABA, chlormequat, ethephon, triazoles with growth regulation activity like metconazole, tebuconazole and paclobutrazol and the like, an auxin and/or cytokinin.

Suitable gibberellins include gibberellic acid ($GA_3$), $GA_4$, $GA_7$ and others. More generally, the term "gibberellins" encompasses diterpenoids having a tetracyclic ring system. In terms of their nomenclature, gibberellins were numbered in order of their discovery, so the numbering does not signify the position of one particular substituent. The compounds have nineteen or twenty carbons, and four or five ring systems. Some examples of gibberellins include $GA_3$, commonly referred to as gibberellic acid; and $GA_4$ and $GA_7$, which are immediate precursors of $GA_3$. There are approximately 130 gibberellins described today, and these are encompassed by the general term "gibberellin". Gibberelin derivatives include for example 16,17-dihydro gibberellins.

In the formulations, either a single gibberellin or a combination of two or more gibberellins may be employed. The gibberellin(s) may be selected from the group consisting of gibberellin $A_4$ ($GA_4$), gibberellin $A_3$ ($GA_3$), gibberellin $A_5$ ($GA_5$), gibberellin $A_7$ ($GA_7$), gibberellin $A_{14}$ ($GA_{14}$), and mixtures thereof. Preferred gibberellins are ($GA_4$), gibberellin $A_3$ ($GA_3$), gibberellin $A_7$ ($GA_7$) or mixtures of these.

The amount of gibberellins depend on the specific compound, and will generally be between about 1 to about 25 wt %, preferably between about 5 wt % and about 25 wt % and more preferably between about 7 wt % and about 20 wt %.

S-ABA may be used in an amount between about 1 to about 35 wt %.

For example, S-ABA may be used in an amount between about 1 to about 25 wt %, preferably between about 5 wt % and about 25 wt % and more preferably between about 7 wt % and about 20 wt %.

Suitable auxins include natural or synthetic chemicals that behave like the naturally occurring auxins produced by plant enzyme systems, and the term "auxin" and "auxins" as used herein refers to such compounds in natural and synthetic form. Indoleacetic acids, indol-3-butyric acid (3-BA); naphthaleneacetamide; 2 methyl-1-naphthaleneacetic acid and 2-methyl-1-naphthylacetamide have hormonal activity and may be substituted for the naturally occurring auxins. It may be useful to have metal ions present with the auxins, such as for example zinc or manganese. In preferred embodiments, the auxin employed is selected from the group consisting of 3-indolebutyric acid, 3-indoleacetic acid, 1-naphthylacetic acid, 3-indolebutyric acid, and salts and esters thereof. Preferably, the metal ions required for a good activity are supplied together with the auxin.

Suitable cytokinins are a class of plant regulation substances (phytohormones) that promote cell division, or cytokinesis, in plant roots and shoots. There are two types of cytokinins adenine-type cytokinins represented by kinetin, zeatin, and 6-benzylaminopurine (also referred to as BAP, 6-BAP, or 6-benzyladenine), and phenylurea-type cytokinins like diphenylurea and thidiazuron (TDZ). In preferred embodiments the cytokinin is selected from the group consisting of kinetin (synthetic or derived from seaweed), 6-BAP, 1-(2-chloropyridin-4-yl)-3-phenylurea (CPPU), and TDZ.

In one preferred embodiment, the second active component is ethephon, because ethephon also acts as the strong acid.

In a particularly preferred embodiment, the concentrate comprises prohexadione and ethephon, in particular a prohexadione salt and ethephon. This combination of compounds is stably provided in the concentrate of the invention, and shows synergistic effect, even when relatively low amounts of ethephon are used, in the treatment of cereal crops, rape seed and the like.

Suitable amounts of ethephon in the ionic liquid are between 5 wt % to 40 wt %, preferably between 10 and 30 wt %, combined with an amount of prohexadione calcium of 3-10 wt %, preferably 4-8 wt %. The relative weight amount of prohexadione salt to ethephon preferably is in de range of 1:2 to 1:8, preferably 1:3 to 1:6, like for example about 1:4 to 1:5.

The concentrate according to the invention comprises an organic base as carrier solvent, which has solubility in water because of its ionic nature. However, when diluted in water, the compounds may neutralize, and one or more constituents may become less soluble, and may form a fine emulsion.

The concentrate may further comprise diluents, to lower the viscosity, or reduce the tendency of the ionic liquid to become a gel.

The concentrate may further comprise hydrophobic compounds like a vegetable oil with a melting point of about 10° C. or lower, preferably of about 0° C. or lower. Suitable vegetable oils are e.g. palm oil, soybean oil, rapeseed oil, sunflower oil, cotton seed oil, palm kernel oil, coconut oil, linseed oil, olive oil, peanut oil and the like. Suitable derivatives of vegetable oils include alkyl esters of the fatty acids, like for example $C_1$-$C_6$-alkyl esters, like for example bio-diesel, or methyl esters of rape seed oil and the like.

Even though vegetable oils are preferred for environmental reasons, other organic fluids can be used, like hydrocarbon oils such as toluene, naphthalene, octane, decaline, or paraffin oils such as $C_{15}$-$C_{30}$ hydrocarbons are suitable, optionally in admixture with lower carbon number alkanes.

Other suitable solvents comprise ethers, like t-butyl-methyl ether, esters such as t-butyl-aceytate, butyl-acetate, DMSO, dioxane, monopropylene glycol and the like.

As indicated above, the concentrate according to the invention may further contain an emulsifier. The emulsifier may aid in the concentrate of the growth regulator on dilution in water and the emulsifier may aid in the emulsification of the carrier fluid in the water phase. Also, the emulsifier may promote the uptake of the active by the plant.

Preferably, the emulsifier is an alkoxylated sugar, preferably esterified with fatty acids or sugar, esterified with fatty acids. Suitable sugars, or polyols, are pentaeritritol, sorbitol, maltose, trimethylolpropane, ethyleneglycol and the like. The alkoxygroups preferably are ethyloxy or propyloxy, and most preferably at least comprise at least 3 ethoxy groups, preferably at least 5 ethoxy groups. Esterification with fatty acids may comprise esterification with $C_{12}$-$C_{24}$ fatty acids, wherein the fatty acids may be unsaturated, and preferably are monounsaturated. The inventors have found the ethoxylated sorbitans to be most preferred emulsifiers. Examples of such ethoxylated esterified sorbitans are Atlas G 1086, Atlas G 1096, Arlatone TV, Tween L-0515, Tween L-1010 and Tween L-15-05. Further suitable dispersants are Atlox 4912, Atlox 4914 and Atlox LP-1, which comprise ethoxylated polyhydroxystearic acid, copolymers of fatty acid. Further suitable emulsifiers include alcohol-alkylene oxide addition products, such as tridecyl alcohol-C16 ethoxylate; ethoxylated fatty acids such as castor oil ethoxylate (EO 25 or 40) and polyethylene glycol esters of fatty acids, such as polyethyleneglycol stearate. Further suitable emulsifiers comprise alkylpolyglycoside type surfactants. Further suitable emulsifiers include alcohol block copolymers, such as Adsee 978. Further suitable emulsifiers include phosphate esters of fatty alcohol ethoxylate, such as Hostaphat 1306.

Hence, the preferred emulsifier is non-ionic, and comprises at least one fatty acid group, at least one polyethoxy group, or more than one ethoxy group, and at least one polyol (diol, triol or higher alcohol), wherein the fatty acid and polyol may be combined in hydroxyl-fatty acid.

A further preferred emulsifier is non-ionic, and is an alcohol block copolymer.

A further preferred emulsifier is anionic, and comprises an acid phosphate ester of a fatty alcohol ethoxylate.

It may be useful to use more than one emulsifier. Suitable additional emulsifiers are anionic, cationic or further non-ionic emulsifiers.

Typical emulsifiers, or surface-active agents, are alkyl sulphate salts, such as diethanol ammoniumlaurate sulphate, alkylarylsulphonate salts, such as like calcium dodecyl benzene sulphonate, alkylphenol-alkylene oxide addition products, such as nonylphenol-C18 ethoxylate; alcohol-alkylene oxide addition products, such as tridecyl alcohol-C16 ethoxylate; ethoxylated fatty acids such as castor oil ethoxylate (EO 25 or 40), soaps such as sodium stearate; alkylnaphthalene-sulphonate salts such as sodium dibutylnaphthalenesulphonate; dialkylesters of sulphosuccinate salts, such as sodium di(2-ethylhexyl) sulpho-succinate; sorbitol esters such as sorbitol oleate; quaternary amines, such as lauryl trimethylammonium chloride; polyethylene glycol esters of fatty acids, such as polyethyleneglycol stearate; block-copolymers of ethyleneoxide and propylenenoxide; salts of mono and dialkyl phosphate esters; polyamine-fatty acid condensates; random polyester condensates; lecitine or modified lecitines; mono- or di-glycerides and the like.

The amount of emulsifier—if present—is generally about 1 wt % or more, preferably about 3 wt % or more. Generally, the amount will be about 30 wt % or less. Suitable amounts include about 5 wt %, about 10 wt % or about 20 wt %. The amount is the total amount of the combined emulsifiers.

The concentrate according the invention may comprise further components, such as for example at least one of a further growth regulator, a fungicide, an antioxidant, a biocide, an antifoam, a metal compound, or another additive known in the art like safeners, colorants and the like.

The concentrate according to the present invention may further comprise a fungicide. Preferably, one or more of the following fungicides is used: Specific anti powdery mildew fungicides such asmorfolines like fenpropidine and fenpropimorf, metrafenone, cyflufenamide, quinoxyfen and proquinazid; SBI fungicides like triazoles like epoxiconazole, prothioconazole, metconazole, tebuconazole, isopropanol-azol compounds etc; Strobilurines (Qol fungicides) like azoxystrobin, coumoxystrobin, dimoxystrobin, enoxastrobin, famoxadone, fenamidone, fenaminostrobin, fluoxastrobin, flufenoxystrobin, kresoxim-methyl, metominostrobin, orysastrobin, pyraoxystrobin, picoxystrobin, pyraclostrobin, pyrametastrobin, pyribencarb, triclopyricarb trifloxystrobin and SDHI like fungicides like benodanil, bixafen, boscalid, carboxin, fenfuram, fluopyram, flutolanil, fluxapyroxad, furametpyr, isopyrazam, mepronil, oxycarboxin, penflufen, penthiopyrad, sedaxane and thifluzamid. A further suitable fungicide comprises acribenzolar-s-methyl and mefentrifluconazole.

Suitable further compounds that can be added are jasmonates or phosphonic acid, which strengthen the defence mechanisms of the plants. Suitable jasmonates include methyl jasmonate, propyldihydrojasmonate and jasmonic acid.

Suitable further compounds that can be added are metal compounds, such as for example zinc, manganese, selenium, iron, copper, boron, molybdenum and magnesium, mixtures of these, and the like. The metal ions can be used as chelates or salts, like for example EDTA chelates, citrate salts, proteinates or otherwise in a form that the metals are absorbed by the plant leafs.

The concentrate according the invention may further include an anti-oxidant, such as for example vitamin-E, butylated hydroxyanisole, Vulkanox BHT (2,6-di-tert.-butyl-p-cresol) or butylhydroxytoluene.

The concentrate of the invention may further include an antifoam such as silicone based oils, magnesiumstearate or octanol.

The concentrate according the invention may further include a biocide, like a bactericide and/or algicide, like for example isothiazolin-3 derivatives, like benzyl-isothiazolin, n-octyl isothiazolinone, chloro-methyl and methyl isothiazolinone; bromo-nitro-propane-diol; ethylenedioxydimethanol; (3-(3,4-dichlorophenyl)-1,1-dimethylurea; iodo-propynyl butyl carbamate; N-trichloromethylthiophtalimide; Zinc Pyrithione; dichlorophen, streptomycin, coppersulphate, or sorbate.

The further compounds generally will be dissolved in the ionic liquid, which has a strong dissolving power.

A further aspect of the invention is a liquid concentrate comprising one or more dissolved plant growth regulators in an ionic liquid, the ionic liquid comprising an organic base and a strong acid, wherein said organic base is an amide, imide or urea and the molar ratio of acid to base is between about 1:2 to about 1:10.

The one or more plant growth regulators can be any as defined above: i.e. one or more of: one or more gibberellins, gibberellin derivatives such as for example 16,17-dihydro gibberellins, S-ABA, chlormequat, ethephon, triazoles with growth regulation activity like metconazole, tebuconazole and paclobutrazol and the like, an auxin and/or cytokinin.

Preferably, the one or more plant growth regulators is one or more of: a gibberellin, gibberellin derivative, S-ABA, chlormequat, ethephon, triazoles with growth regulation activity like metconazole and tebuconazole and the like, an auxin and/or at least one cytokinin, wherein preferably the composition further comprises at least one fungicide, chosen from specific anti powdery mildew fungicides, SBI fungicides, QoI fungicides and SDHI fungicides.

The ionic liquid comprises an organic base which is an amide, imide or urea. The organic amide bases suitable for use in the first aspect of the invention are also suitable for this aspect of the invention. Similarly, suitable imide and urea compounds can be any as previously defined.

Preferably, the organic base is a tertiary amide.

The acid is a strong acid, which is suitable to form an ionic liquid with the organic base.

Generally, the strong acid has a pH lower than 4, preferably lower than 3, and more preferably lower than about 2.5, and even more preferably lower than about 2.2.

Generally, the acids suitable for use with the first aspect of the invention are also suitable for use with this aspect of the invention. Preferably, the strong acid is camphor sulfonic acid and/or ethephon.

The molar ratio of acid to base is between about 1:2 to 1:10. More preferably 1:4 to 1:8.

Unexpectedly, the ionic liquid systems had strong dissolving power and were capable of providing concentrates which showed good stability characteristics (e.g. no crystallization) and desirable viscosity even at high concentrations.

The concentrate may further comprise an emulsifier which aids in stabilizing the water miscibility and self-emulsifying properties when diluted in a suitable dilution in water. Emulsifiers suitable for use with this aspect of the invention are the same as detailed with the previous aspect.

The concentrate preferably comprises an adjuvant. Adjuvants are generally surfactants which promote wetting of the leaf surface or uptake of the active ingredient into the plant. Adjuvants suitable for use with this aspect of the invention are the same as the emulsifiers detailed with the previous aspect.

Suitable further compounds that can be added are jasmonates or phosphonic acid, which strengthen the defense mechanisms of the plants. Suitable jasmonates include methyl jasmonate, propyldihydrojasmonate and jasmonic acid.

Suitable further compounds that can be added are metal compounds, such as for example zinc, manganese, selenium, iron, copper, boron, molybdenum and magnesium, mixtures of these, and the like. The metal ions can be used as chelates or salts, like for example EDTA chelates, citrate salts, proteinates or otherwise in a form that the metals are absorbed by the plant leaves.

The concentrate according the invention may further include an anti-oxidant, such as for example vitamin-E, butylated hydroxyanisole, Vulkanox BHT (2,6-di-tert.-butyl-p-cresol) or butylhydroxytoluene.

The concentrate of the invention may further include an antifoam such as silicone based oils, magnesiumstearate or octanol.

The concentrate according the invention may further include a biocide, like a bactericide and/or algicide, like for example isothiazolin-3 derivatives, like benzyl-isothiazolin, n-octyl isothiazolinone, chloro-methyl and methyl isothiazolinone; bromo-nitro-propane-diol; ethylenedioxydimethanol; (3-(3,4-dichlorophenyl)-1,1-dimethylurea; iodo-propynyl butyl carbamate; N-trichloromethylthiophtalimide; Zinc Pyrithione; dichlorophen, streptomycin, coppersulphate, or sorbate.

The further compounds generally will be dissolved in the ionic liquid, which has a strong dissolving power.

The concentrates as described above are suitable to be diluted to obtain a water based spraying liquid for spraying plants.

Such water based spraying liquid comprises water and a suitable amount of concentrate. Further, other additives, actives etc. may be present, which can be separately mixed with the water.

A suitable dilution comprises about 96 wt % water or more and about 4 wt % of said concentrate or less. Preferably, the concentrate is diluted with water in a range of about 1:50 to about 1:500, preferably about 1:50 to 1:200 (in volume/volume). Suitable amounts of concentrate in water include 0.1 wt. %, 0.5 wt. %, 1 wt %, 1.25 wt %, 1.5 wt %.

As explained above, the concentrate may comprise additional active compounds like further growth regulators, fungicides, insecticides, acaricides and the like. However, it may also be effective to add additional active compounds and/or additives to the water based spraying liquid. For example, such additional active compound may be stable and soluble in water and are preferably delivered to the farmer as concentrated solution in water. The concentrate according the invention allows a great freedom to operate for a farmer.

Hence, additives or additional active components, to be used in combination with prohexadione can be added to the concentrate, but can also be added directly to the water phase. In case of a prohexadione salt, an ammonium salt such as for example ammoniumsulphate, ammonium nitrate, ammonium propionate and optionally an acid such as for example a carboxylic acid, such as for example citric acid, adipic acid, acetic acid or the like can be added to the water phase, instead of being part of the concentrate.

Suitable additional active compounds include a further growth regulator, a fungicide, a metal compound and/or a jasmonate.

The additional plant growth regulators are as described above.

Suitable additional compounds include specific anti powdery mildew fungicides such as morfolines like fenpropidine and fenpropimorf, metrafenone, cyflufenamide, quinoxyfen and proquinazid; SBI fungicides like triazoles like epoxyconazol, prothioconazole, metconazole, tebuconazole, mefentrifluconazole, isopropanol-azol compounds etc; Strobilurines (Qol fungicides) like azoxystrobin, coumoxystrobin, dimoxystrobin, enoxastrobin, famoxadone, fenamidone, fenaminostrobin, fluoxastrobin, flufenoxystrobin, kresoxim-methyl, metominostrobin, orysastrobin, pyraoxystrobin picoxystrobin, pyraclostrobin, pyrametastrobin, pyribencarb, triclopyricarb trifloxystrobin and SDHI like fungicides like benodanil, bixafen, boscalid, carboxin, fenfuram, fluopyram, flutolanil, fluxapyroxad, furametpyr, isopyrazam, mepronil, oxycarboxin, penflufen, penthiopyrad, sedaxane and thifluzamid.

Suitable further compounds that can be added are jasmonates or phosphonic acid, which strengthen the defence mechanisms of the plants. Suitable jasmonates include methyl jasmonate, propyldihydrojasmonate and jasmonic acid. A further suitable compound for strengthening plant resistance comprises acibenzolar-S-methyl.

Suitable further compounds that can be added are metal compounds, such as for example zinc, manganese, selenium, iron, copper, boron, molybdenum, and magnesium, mixtures of these and the like. The metal ions can be used as chelates or salts, like for example EDTA chelates, citrate salts, proteinates or otherwise in a form that the metals are absorbed by the plant leafs.

The present invention also relates to a method for treating plants with at least prohexadione, wherein the above described water based spraying liquid is sprayed on plants in an amount such that the effective amount of concentrate is about 50 mL or more, preferably about 500 mL or more up to about 20 L or less of said concentrate per hectare.

Preferred amounts of the effective amount of concentrate are between about 0.5 L to about 5 L, and more preferably about 1-2 L for one hectare.

The spray solution made by dilution of the concentrate will generally be sprayed at a volume of about 50 L/ha to about 2500 L/ha, preferably about 100 L/ha to about 500 L/ha.

The method according the invention is preferably applied to broad acre crops. Suitable broad acre crops include tuber or root crops, cereal crops, oil crops, fiber crops and other crops. Suitable tuber or root crops include potatoes or sugar beet. Suitable cereal crops include maize, rice, wheat, barley, rye and grain. Suitable oil crops include soy bean, sunflower, rape-seed or peanut. Fiber crops include for example flax. Other crops include clover, cotton, mustard, poppy or sugarcane.

In one preferred embodiment, the preferred broad acre crop is cereal, preferably barley, wheat, or grain.

The method according to the invention is preferably applied to ornamental crops. Suitable crops include *Ageratum, Aster, Azalea, Begonia, Brassica, Browallia, Calendula, Celosia, Centaurea, Coleus, Cosmos, Crossandra, Dahlia, Delphinium, Dianthus, Dicentra, Dusty Miller, Exacum, Ficus, Gardenia, Gerbera, Gomphrena, Hibiscus, Lisianthus, Lobelia, Marigold, Nemesia, Philodendron, Phlox, Poinsettia, Pothos, Radermachera, Salvia, Schefflera, Syngonium, Tagetes, Verbena, Vinca, Violets* and *Zinnia, Kalanchoe, Hydrangea, Petunia, Calibrachoa, Helianthus, Chrysanthemum* and *Sun-flowers*.

The method according to the invention is preferably applied to fruit trees. Suitable fruit trees include for example apple, avocado, pear, cherry and grape.

EXAMPLES

A number of tests have been done, to show solubility of prohexadione calcium by providing an ionic liquid.

Molar ratio acid to amide was generally 1:1, 1:2 or 1:3 (about equal or more amide than acid), as indicated in the tables.

As a control, the solubility of prohexadione-calcium was tested in all solvents. Prohexadione-calcium was insoluble in all solvents.

As a control, propionic acid was dissolved in 5 solvents mentioned in Table 1, and the solubility of prohexadione-calcium was tested in said mixture. Virtually no prohexadione was dissolved, showing that if the addition of an organic acid does not result in a ionic liquid, prohexadione-calcium cannot be dissolved.

The following tertiary amides were used:
N,N-dimethylamide of lactic acid Agnique AMD 3L
N,N-dimethyl decamide (C10) Agnique AMD 10;
N,N-dimethyl octamide (C8) (+C10) Jeffsol AG1730
N-butylpyrrolidin-2-one Genagen NBP
Methyl-5-(dimethylamino)-2-methyl oxopentanoate Rhodiasolve Polarclean
N-octyl pyrrolidone Ashland Surfadone
N,N-dimethyl acetamide DMA
N,N-dimethyl propenamide DMP
N,N-diethyl acetamide DEA
N,N-dimethyl-3-methoxyproponamide KJC MPA100 (KJC Corp)
N,N-dimethyl-3-butoxyproponamide KJC BPA100 (KJC Corp)
N,N-dimethyl-2-methylpropanamide DMIBA
1,3-dimethyl-2-imidazolidinone DMI
N-Acyl morpholine AcM
N,N-diethyldodecamide N,N-diethyl laurylamide
Tetramethyl urea TMU
N,N-dimethylpropylene urea DMPU
2-pyrrolidinone
2-piperidone
N-ethylacetamide
The following acids have been used:
Ethephon (pKa 2.5)
Lactic acid (pKa 3.86)
Paratoluenesulfonic acid (pKa 2.8)

Oxalic acid (pKa=1.23)
Phosphoric acid (pKa 2.1)
Camphor sulfonic acid (pKa=1.2)
Sulfuric acid (pKa=−3)
Dibutylphosphate (pKa=2.32)
1-hydroxyethane-1,1-diyl)bis(phosphonic acid) (HEDP) (pKa=1.35)
2-hydroxyethyl sulphonic acid (HESA) (pKa=−1.4)

Examples 1-10

25 g ethephon (91% technical grade; about 5% water) was added as melt to an amount of tertiary amide, in 1:1 and 1:2 molar ratio, as given in Table 1. The temperature generally was held at 50° C. for about 3 hr. Ethephon dissolved in the solvent, providing a clear brown liquid. Next, an amount of micronized prohexadione-calcium (>90% particles<7 μm) was added and thoroughly mixed. The amount was sufficient to provide a concentration of 5 wt % relative to the amount of the composition.

After mixing the prohexadione, some dissolution of the prohexadione was observed immediately; and after leaving the mixture overnight, optionally in an oven at 50° C., almost complete dissolution was seen in most cases.

It is expected that further heating and or agitation would have resulted in complete dissolution of the prohexadione. Also, slightly lower amounts like 3 or 4 wt % will dissolve more easily.

TABLE 1

| Experiment # (ratio) | Solvent | Wt amount of solvent | Total mass of ionic liquid | Remarks |
|---|---|---|---|---|
| 1 (1:1) | Agnique AMD 3 L | 18.2 | 43.3 | Dissolved |
| 2 (1:2) | Agnique AMD 3 L | 36.5 | 61.5 | Dissolved |
| 3 (1:1) | Agnique AMD 10 | 31.1 | 56.2 | Dissolved |
| 4 (1:2) | Agnique AMD 10 | 62.1 | 87.1 | Slight hazy |
| 5 1:1) | Genagen NBP | 22.0 | 47.0 | Slight sediment |
| 6 (1:2) | Genagen NBP | 44.0 | 69.0 | Dissolved |
| 7 (1:1) | Jeffsol AG 1730 | 35.4 | 60.5 | Slight sediment |
| 8 (1:2) | Jeffsol AG 1730 | 70.8 | 95.9 | Hazy amber |
| 9 (1:1) | Rhodiasolv polarclean | 29.2 | 54.2 | Dissolved |
| 10 (1:2) | Rhodiasolv polarclean | 58.3 | 83.4 | Hazy amber |

$^{13}$C NMR of Genagen NBP with and without ethephon shows substantial chemical shifts for the three carbons attached to the amine, indicative for the formation of a ionic liquid (chemical shifts for C1 (the carbon carrying the oxygen) 170.312 to 174.064; for C2 from 43.628 to 45.064 and for C3 from 38.686 to 39.712). $^{13}$C NMR in deuterated water showed a break-up of the ionic liquid character, as about the same chemical shifts were observed as with the reference.

Examples 11-15

In a comparable way, the following 5 concentrates were prepared with lactic acid as the acidic compound. It may be noted that for lactic acid, a 1:1 ratio was preferred over a 1:2 ratio.

TABLE 2

| Experiment # (ratio) | Solvent | Wt amount of solvent | Total mass of ionic liquid | Remarks |
|---|---|---|---|---|
| 11 (1:1) | Agnique AMD 3 L | 19.5 | 34.6 | Gel like; fluid on stirring |
| 12 (1:1) | Agnique AMD 10 | 33.2 | 48.2 | Gel like; |
| 13 1:1) | Genagen NBP | 23.5 | 38.5 | Thick gel |
| 14 (1:1) | Jeffsol AG 1730 | 37.9 | 52.9 | Thick gel |
| 15 (1:1) | Rhodiasolv polarclean | 31.2 | 46.3 | Thick gel |

Probably, the additional hydroxyl group in lactic acid caused a gel to form. It is expected that with the addition of some solvent, the gel will break, and that the composition will be fluid. Despite the gel, prohexadione calcium was dissolved in the system.

Examples 16-20

In a comparable way to example 1, the following 5 concentrates were prepared with phosphoric acid. Either 17.6 gm 85% phosphoric acid, comprising about 15 wt % water was used, or 15 gm 99% phosphoric acid. When phosphoric acid was mixed with the solvent, heat was clearly generated.

TABLE 3

| Experiment # (ratio) | Solvent | Wt amount of solvent | Total mass of ionic liquid | Remarks |
|---|---|---|---|---|
| 16 (1:1) | Agnique AMD 3 L | 21.0 | 38.6 | Almost dissolved |
| 17 (1:2) | Agnique AMD 3 L | 42.1 | 59.9 | Almost dissolved |
| 18 (1:1) | Genagen NBP | 25.4 | 43.0 | Cloudy liquid |
| 19 (1:1) no water | Genagen NBP | 21.6 | 36.6 | Hazy liquid |
| 20 (1:1) | Rhodiasolv polarclean | 33.6 | 51.5 | Cloudy viscous liquid |

Very little undissolved prohexadione calcium was visible, which is supposed to dissolve on longer stirring or heating.

Examples 21-22

In a comparable way as in example 1, the following 2 concentrates were prepared with para-toluene sulphonic acid (pTSA.H2O) as the acidic compound and Agnique AMD 3L as solvent.

TABLE 4

| Experiment # (ratio) | solvent | Wt amount of solvent | Total mass of ionic liquid | Remarks |
|---|---|---|---|---|
| 21 (1:1) | Agnique AMD 3 L | 17.0 | 42.1 | Dissolved |
| 22 (1:2) | Agnique AMD 3 L | 34.0 | 59.0 | Dissolved |

Examples 23-30

In a comparable way as to example 1, the following mixtures were made. In these experiment, ratios of 1:2 and 1:3 acid-amide solvent were used with 10 gm of oxalic acid as acid component. In some experiments, water was added.

TABLE 5

| Experiment # (ratio) | Solvent | Wt amount of solvent | Total mass of ionic liquid | Remarks |
|---|---|---|---|---|
| 23 (1:2) | Agnique AMD 3 L | 26.0 | 36.0 | Dissolved after 2 hr |
| 24 (1:3) | Agnique AMD 3 L | 39.0 | 49.1 | Dissolved after 2 hr |
| 25 (1:2) | Genagen NBP | 31.4 | 41.5 | Cloudy with some solid |
| 26 (1:3) | Genagen NBP | 47.1 | 57.2 | Cloudy with some solid |
| 27 (1:2) | Genagen NBP + 1 g water | 31.4 | 41.4 | Cloudy with some solid |
| 28 (1:3) | Genagen NBP + 1 gm water | 47.1 | 57.1 | Cloudy with some solid |
| 29 (1:1) | Rhodiasolv polarclean | 41.6 | 51.6 | Cloudy with some solid |
| 30 (1:2) | Rhodiasolv polarclean | 62.4 | 72.5 | Cloudy with some solid |

In these experiments, Agnique AMD 3L initially resulted in clear solutions, however after 24 hr the liquid was a bit cloudy. No undissolved prohexadione calcium was observed. The other solvent systems did dissolve prohexadione calcium, but not fully.

Example 31-32

The following ionic liquids were prepared from ethephon and prohexadione calcium in Agnique AMD 3L or Genagen NBP. The concentration is equivalent to g/L in the final product. The components were simply mixed, and no heating step was applied. Stability testing was according to standards.

TABLE 6

| Example | 31 | 32* |
|---|---|---|
| Prohexadione-Ca | 51.1 | 51.1 |
| Ethephon | 219.3 | 219.3 |
| Agnique AMD 3 L | 786.8 | |
| Genagen NBP | | 718.6 |
| Stability: | | |
| % prohex after 2 wks 54° C. | 83% | 92% |
| Appearance | | |
| Initial | Clear yellow solution | Dissolved, but white suspension* |
| After 2 weeks 54° C. | Clear yellow solution | Hazy yellow solution (dissolved) |
| After 2 weeks 0° C. | Clear yellow solution | Dissolved, but white suspension* |
| After 2 weeks −5° C. | Clear yellow solution | Dissolved, but white suspension* |
| After 2 weeks −10° C. | Clear yellow solution | Dissolved, but white suspension* |

*If the samples are heated, a clear solution is obtained, which stays dissolved on storage.

Agnique AMD 3L with ethephon formed a ionic liquid that spontaneously dissolved prohexadione calcium. Genagen NBP dissolved after heating to 54° C. The chemical stability of prohexadione—even with water present—was considered good.

Example 33-34

A further set of compositions was prepared, with the addition of a dispersant, Atlas G1086. The pH value was measured in CIPAC D water; the particle size was measured after dilution in water. Microscopic evaluation showed that the particles actually are droplets rather than solid particles. From the suspensibility, it appears that the concentrates are well dispersible in water.

TABLE 7

| Example | 33 | 34 |
|---|---|---|
| Prohex-Ca | 51.1 | 51.1 |
| Ethephon | 219.3 | 219.3 |
| Atlas G1086 | 50 | 50 |
| Agnique AMD 3 L | 786.8 | |
| Genagen NBP | | 718.6 |
| Initial appearance | Clear yellow solution | Dissolved, but white suspension* |
| Results from diluting the samples in water | | |
| pH value 1.66% in CIPAC D | 2.0 | 2.1 |
| pH value 0.33% in CIPAC D | 2.6 | 2.6 |
| Particle size** d90 (μm) | 21.2 | 2.6 |
| Particle size** d50 (μm) | 9.9 | 1.2 |
| Particle size** d10 (μm) | 4.0 | 0.7 |
| Suspensibility (%) gravimateric | 97 | 101 |
| Appearance of dilution | Grey/white dilution | Hazy white dilution |

* If the samples are heated, a clear solution is obtained, which stays dissolved on storage.
*particles actually are droplets, not solid particles; hence, an emulsion is formed, no dispersion.

Examples 35-36

Two further examples were prepared, with additional additives which are commonly used to stabilize dispersions.

TABLE 8

| Example | 35 | 36 |
|---|---|---|
| Prohexadione-Ca | 51.1 | 51.1 |
| Ethephon | 219.3 | 219.3 |
| Atlas G1086 | 50 | 50 |
| Aerosol 200 | 10 | |
| Bentone SD1 | | 10 |
| Genagen NBP | 719.3 | 719.3 |
| Stability | | |
| Prohexadione 12 days at 54° C. | 93% | 94% |
| Ethephon 12 days at 54° C. | 93% | Not determined |
| pH value CIPAC MT 75.3 | | |
| Initial | 2.1 | 2.1 |
| 12 days at 54° C. | 2.1 | 2.2 |
| Appearance | | |
| Initial | Grey suspension | Grey suspension |
| 4 days ambient | Clear yellow solution above loose grey sediment (<1%) | Clear yellow solution above loose grey suspension (no sediment) |
| 12 days at 54° C. | Clear yellow solution above loose grey sediment (<1%) | Clear yellow solution above loose grey suspension (no sediment) |
| 10x freeze/thaw | Clear yellow solution above loose grey sediment (<1%) | Clear yellow solution above loose grey suspension (no sediment) |

As is clear from the table, prohexadione calcium was after a few days dissolved in the ionic liquid. The grey sediment or loose grey suspension are the anti-settling agents aerosol or bentone. The concentrates were well dispersible (according CIPAC D 1.7%), having a hazy white appearance after dilution, without sediment, also after 24 hr. These results were obtained for dilution done at room temperature, or at 5° C., and resulted in the same appearance of both the original material, as the aged material (12 days at 54° C.).

Examples 37-38

Molten ethephon was added to Genagen NBP at 50° C. Micronized prohexadione calcium was added while the mixture was held at 50° C. for 24 hr without stirring. A clear yellow solution was obtained. Next, ammonium proprionate was added, and the mixture was stirred at room temperature for 3 hr. All ammonium proprionate was dissolved.

TABLE 9

| Example | 37 | 38 |
|---|---|---|
| Prohex-Ca | 52.3 | 52.3 |
| Ethephon | 219.3 | 219.3 |
| Ammonium propionate | 50 | 100 |
| Genagen NBP | 745.0 | 717.9 |
| Appearance | Clear yellow solution | Clear yellow solution |

Examples 39A-J

Ionic liquids were prepared by providing an organic base solvent and ethephon. Molar ratio of ethephon:solvent differed but was generally 1:2 to 1:8 as indicated in the table.

10 g of solvent was provided, to which a suitable amount of ethephon was added. After the ionic liquid had formed, 5 wt. % prohexadione-Ca was added to provide a liquid concentrate.

The mixture was left overnight at 50° C. under stirring. After cooling to room temperature, the mixtures were assessed.

TABLE 10

| Experiment (solvent) | ethephon: solvent ratio | Remarks |
|---|---|---|
| 39-A (NBP) | 1:2 | Clear |
|  | 1:3 | Clear |
|  | 1:4 | Clear-20% ethephon |
|  | 1:5 | Clear |
|  | 1:6 | Clear-15% ethephon |
|  | 1:7 | Hazy |
|  | 1:8 | Hazy |
| 39-B (Surfadone) | 1:2 | Clear |
|  | 1:3 | Clear |
|  | 1:4 | Clear |
|  | 1:5 | Hazy |
|  | 1:6 | Hazy |
| 39-C (AMD 3 L) | 1:2 | Clear |
|  | 1:3 | Clear |
|  | 1:4 | Clear |
|  | 1:5 | Clear |
|  | 1:6 | Clear |
| 39-D (DMA) | 1:2 | Clear |
|  | 1:4 | Clear |
|  | 1:6 | Clear |
| 39-E (DMP) | 1:2 | Clear |
|  | 1:4 | Clear |
|  | 1:6 | Clear |
| 39-F (DEA) | 1:2 | Clear |
|  | 1:4 | Clear |
|  | 1:6 | Clear |
| 39-G (MPA100) | 1:2 | Clear |
|  | 1:4 | Clear |
|  | 1:6 | Clear |
| 39-H (BPA100) | 1:2 | Clear |
|  | 1:4 | Cloudy |
| 39-I (DMIBA) | 1:4 | Clear yellow |
| 39-J (DMI) | 1:2 | Clear yellow |
|  | 1:4 | Clear |
|  | 1:6 | Hazy white |

Due to the good results obtained with NBP, the amount of prohexadione calcium was increased to 10 wt. %, as detailed in Table 11 below.

TABLE 11

| (solvent) | ethephon:solvent ratio | Remarks |
|---|---|---|
| (NBP-10 wt. % prohexadione-Ca) | 1:2 | Hazy |
|  | 1:4 | Hazy |
|  | 1:6 | Cloudy |

Further dissolution was observed after one week at room temperature.

It may be noted that the hazy samples generally have reasonably dissolved/dispersed or emulsified components, and no sedimentation was observed.

Examples 40A-G

Ionic liquids were prepared by providing an organic base solvent and an acid partner (ethephon or camphor sulfonic acid). Molar ratio of acid:solvent differed but was generally 1:2 to 1:8 as indicated in Table 12.

10 g of solvent was provided, to which a suitable amount of acid was added. After the ionic liquid had formed, 5 wt. % prohexadione-Ca was added (unless indicated otherwise), to provide a liquid concentrate.

The mixture was left overnight at 50° C. under stirring. After cooling to room temperature, the mixtures were assessed.

TABLE 12

| # (Solvent) | Acid | Acid:solvent ratio | remarks |
|---|---|---|---|
| 40-A (Acylmorpholine) | Ethephon | 1:4 | Clear |
| 40-B (N,N-diethyl laurylamide) | Ethephon | 1:6 | Hazy, some precipitation upon cooling |
| 40-C (TMU) | Ethephon | 1:4 | Hazy |
|  |  | 1:6 | Hazy |
|  | CSA | 1:4 | Clear |
|  |  | 1:6 | Clear |
| 40-D (DMPU) | Ethephon | 1:4 | Hazy |
|  | CSA | 1:4 | Clear |
|  |  | 1:6 | Clear |
| 40-E (2-pyrrolidinone) | Ethephon | 1:4 | Clear |
|  |  | 1:6 | Hazy |
|  |  | 1:8 | Hazy |
|  | CSA | 1:4 | Clear |
|  |  | 1:6 | Clear |
|  |  | 1:8 | Clear |
| 40-F (2-piperidone) | CSA | 1:6 | Hazy |
|  |  | 1:8 | Clear |
| 40-G (N-ethylacetamide) | Ethephon | 1:4 | Clear |
|  |  | 1:6 | Clear |
|  | CSA | 1:6 | Clear |
|  |  | 1:8 | Clear |

Examples 41A-G

Ionic liquids were prepared by providing prepared by providing an organic base solvent and an acid partner. Molar ratio of acid:solvent differed but was generally 1:2 to 1:8 as indicated in Table 13.

10 g of solvent was provided, to which a suitable amount of acid was added. After the ionic liquid had formed, 5 wt. % prohexadione-Ca was added (unless indicated otherwise), to provide a liquid concentrate.

The mixture was left overnight at 50° C. under stirring. After cooling to room temperature, the mixtures were assessed.

TABLE 13

| # (acid) | Solvent | Acid:solvent molar ratio | remarks |
|---|---|---|---|
| 41-A (phosphoric acid) | 3 L | 1:4 | Clear |
| 41-B (sulphuric acid) | 3 L | 1:4 | Clear |
| 41-C (camphor sulphonic acid) | DM10 | 1:2 | Clear |
| | NBP | 1:4 | Clear |
| | NBP | 1:8 | Clear |
| | DMA | 1:4 | Clear |
| | 3L | 1:8 | Clear |
| | MPA | 1:8 | Clear |
| | Polarclean | 1:4 | Clear |
| 41-D (p-toluene sulfonic acid) | NBP | 1:4 | Hazy |
| | | 1:6 | Clear |
| 41-E (dibutylphosphate) | 3 L | 1:4 | Clear |
| | MPA100 | 1:4 | Clear |
| | DM10 | 1:2 | Clear |
| | DMI | 1:4 | Clear |
| 41-F (neat (1-hydroxyethane-1,1-diyl)bis(phosphonic acid) (HEDP)) | NBP | 1:6 | Clear |
| | | 1:8 | Clear |
| 41-G (neat 2-hydroxyethyl sulphonic acid (HESA)) | 3 L | 1:4 | Clear |
| | | 1:6 | Clear |

As the systems comprising camphor sulfonic acid showed good solubility properties, the interaction of camphor sulfonic acid and the solvents 3L, MPA100, DM10 and NBP was studied further using $^1$H NMR. Significant shifts of the acidic proton, as well as the hydrogens on the carbons a to the nitrogen, were observed for all systems.

Examples 42A-G

Mixed solvent systems comprising ionic liquids were prepared as detailed in Table 14. All systems were clear solutions.

TABLE 14

| Sample | Component | wt. % |
|---|---|---|
| 42-A | NBP | 30 |
| | MPA100 | 43 |
| | Ethephon | 22 |
| | Prohexadione calcium | 5 |
| 42-B | NBP | 30 |
| | MPA100 | 40 |
| | Camphor sulfonic acid | 25 |
| | Prohexadione calcium | 5 |
| 42-C | NBP | 30 |
| | Monopropylene glycol | 43 |
| | Ethephon | 22 |
| | Prohexadione calcium | 5 |
| 42-D | NBP | 30 |
| | Monopropylene glycol | 40 |
| | Camphor sulfonic acid | 25 |
| | Prohexadione calcium | 5 |
| 42-E | N,N-diethyl laurylamide | 75 |
| | MPG | 12 |
| | Camphor sulfonic acid | 8 |
| | Prohexadione calcium | 5 |
| 42-F | 3 L | 64 |
| | HEDP | 19 |
| | Water | 13 |
| | Prohexadione calcium | 4 |
| 42-G | 3 L | 78 |
| | HESA | 14 |
| | Water | 4 |
| | Prohexadione calcium | 4 |

Examples 43A-E

Compositions based of Table 15 were made, wherein the 10 wt. % of adjuvant differed. These compositions were subjected to 54° C. for 2 weeks and assessed, of which the results are shown in Table 25. Assessment included appearance and the amount of prohexadione-calcium after accelerated storage as a percentage of the original amount.

TABLE 15

| Component | g/l | Wt. % |
|---|---|---|
| Prohexadione-Calcium | 51.1 | 4 |
| Ethephon | 205 | 18 |
| Genagen NBP | 776.1 | 68 |
| Adjuvant | 114.7 | 10 |

TABLE 16

| (adjuvant) | Appearance after 2 weeks at 54° C. | Prohexadione-calcium stability |
|---|---|---|
| 43-A (Tween L-0515; Croda) | Clear solution | 93.1 |
| 43-B (Tween L-1010; Croda) | Clear solution | 93.2 |
| 43-C (Tween L-1505; Croda) | Clear solution | 92.8 |
| 43-D (Adsee 978; AkzoNobel) | Clear solution | 94.0 |
| 43-E (Hostaphat 1306; Clariant) | Clear solution | 93.6 |

Example 44A-C

Compositions were prepared according to Table 17, and subjected to accelerated storage, results of which are disclosed in Table 18.

TABLE 17

| Sample | Component | wt. % |
|---|---|---|
| 44-A | NBP | 63.83 |
| | Ethephon | 18.21 |
| | Prohexadione-Calcium | 6.48 |
| | Prothioconazole | 11.48 |
| 44-B | NBP | 57.89 |
| | Camphor sulfonic acid | 23.81 |
| | Prohexadione-Calcium | 6.56 |
| | Prothioconazole | 11.74 |
| 44-C | NBP | 63.64 |
| | Camphor sulfonic acid | 26.17 |
| | Prohexadione-Calcium | 10.19 |

TABLE 18

| Sample | Component | Initial | 2 wk/54° C. | % change |
|---|---|---|---|---|
| 44-A | Prohex-Ca | 6.20% | 5.80% | 6.4% |
| | Prothioconazole | 10.90% | 10.80 | 0.9% |
| 44-B | Prohex-Ca | 6.20% | 6.00% | 3.20% |
| | Prothioconazole | 11.20% | 11.20% | 0% |
| 44-C | Prohex-Ca | 9.60% | 9.30% | 3.10% |

Examples 45A-B

Compositions were made including organic ammonium compounds, as disclosed in Table 19.

TABLE 19

| # (salt) | NH4(Salt) | Prohex-Ca | Ethephon | Tween | NBP |
|---|---|---|---|---|---|
| 45-A (acetate) | 12.19 wt. % | 4.33 wt. % | 17.31 wt. % | 8.65 wt. % | 59.40 wt. % |
| 45-B (formate) | 10.21 wt. % | 4.24 wt. % | 16.97 wt. % | 8.49 wt. % | 58.24 wt. % |

Examples 46-49

Trials were carried out in winter wheat, spring barley, oilseed rape and cut *chrysanthemum*.

Compositions used in the examples 46-49 are disclosed in Table 20 below.

TABLE 20

| Composition # | Active | % w/w | g/L |
|---|---|---|---|
| 46-A | Prohexadione-Calcium | 5.00 | 51.1 |
|  | Ethephon | 20.9 | 205 |
|  | Genagen NBP | 74.1 | 776.1 |
| 46-B | Prohexadione-Calcium | 4.92 | 49.97* |
|  | Ethephon | 20.77 | 199.97* |
|  | Tween L-1010 | 9.45 | 99.98 |
|  | NBP | 64.86 | 686.22 |
| 46-C | Prohexadione-Calcium | 5 | 50 |
|  | Ethephon | 20 | 200 |
|  | Adsee 976 | 10 | 100 |
|  | NBP | 65 | 680 |
| 46-D | Prohexadione-Calcium | 5 | 50 |
|  | Ethephon | 20 | 200 |
|  | Hostaphat 1306 | 10 | 100 |
|  | NBP | 65 | 680 |

*values given as pure compound based on the nominal technical purity

Example 46: Winter Wheat

The trial was carried out in France. The plants were sown on November $2^{nd}$, 2018. Treatment was carried out on January $8^{th}$, 2019; and evaluation on January $21^{st}$ (day 13). Plants were treated using a foliar spray at a rate of 200 L/ha. The treatment rate was 1 l/ha of the compositions in Table 20.

1 l/ha FAL2023 and 0.42 l/ha Cerone was applied to plants as a comparative example. FAL2023 comprises 5 wt. % prohexadione-Ca as active ingredient in an oil-based dispersion, and was prepared in accordance with WO-2015/024995. Cerone is a commercially available ethephon product and comprises about 480 g/L ethephon in water.

The results are detailed in Table 21 below. No phytotoxicity was observed for any treatment.

TABLE 21

| Treatment | Mean plant height/cm | Reduction as % of water-only control |
|---|---|---|
| Water only | 44.39 ± 2.44 | 100 |
| FAL2023 + Cerone | 39.53 ± 7.74 | 89 |
| 46-A | 37.73 ± 2.06 | 85 |
| 46-B | 33.70 ± 2.57 | 76 |
| 46-C | 35.23 ± 3.64 | 79 |
| 46-D | 35.37 ± 4.79 | 80 |

It is clear that the compositions according to the invention were effective at delivering the active ingredients. The compositions comprising adjuvants showed better results than without. The comparative example showed the largest standard deviation.

Example 47: Spring Barley

Trial was carried out in the United Kingdom in 2019. The treatment was applied on day 0, the first evaluation carried out on day 9 and the second evaluation carried out on day 14.

Plants were treated using a foliar spray at a rate of 200 L/ha. The treatment rate was 1 l/ha of the compositions of Table 20. 1 l/ha FAL2023 and 0.42 l/ha Cerone was applied to plants as a comparative example. Table 22 details the results.

TABLE 22

| | Day 9 | | Day 14 | |
|---|---|---|---|---|
| | | | Mean | |
| Treatment | Mean plant height/cm | % height of water-only | plant height/cm | % height of water-only |
| Water only | 40.93 a | 100 | 43.27 a | 100 |
| FAL2023 + Cerone ® | 32.80 c | 80.09 | 29.14 c | 67.60 |
| 46-A | 35.94 bc | 87.82 | 34.82 bc | 80.9 |
| 46-B | 35.52 c | 79.82 | 30.17 c | 70.87 |
| 46-C | 34.47 bc | 84.58 | 31.52 c | 73.53 |
| 46-D | 34.74 bc | 85.2 | 32.97 bc | 77.07 |

It can be observed from the table that all applied treatments were effective, and did not significantly differ in efficacy. The formulation without any adjuvants was slightly less effective. Note that the plants measured were randomly selected.

Example 48: Oilseed Rape

Trial was carried out in March-April. Plants were treated using a foliar spray at a rate of 200 L/ha. Treatment was applied on March $20^{th}$ and evaluation was carried out on April $11^{th}$ (day 22) and May $9^{th}$ (day 50).

Treatment rates of 1 l/ha, 1.5 l/ha and 3 l/ha of 46-B were tested. As comparative example was applied FAL2032 (spray rate 1 l/ha, comprises 75 g/l prohexadione-Ca in an oil dispersion) and Etheverse (commercially available, spray rate 0.63 l/ha, comprises 480 g/l ethephon). See Table 23 for results.

TABLE 23

| Oilseed rape plant height in cm | | |
|---|---|---|
| Treatment | Day 22 | Day 50 |
| Untreated | 85.75 ab | 96.5 a |
| 1 l/ha 46-B | 85 ab | 90 ab |
| 1.5 l/ha 46-B | 76.75 c | 81.5 b |
| 3 l/ha 46-B | 69.5 d | 71 c |
| FAL2032 + Etheverse ® | 77.5 c | 84.25 ab |

It can be observed that the higher concentrations of 46-B were effective at reducing plant height.

Example 49: Cut *Chrysanthemum*

Trial was carried out in The Netherlands. Plants were treated using a foliar spray of 1000 l/ha. The treatment rate of 46-B was 2 l/ha.

Application was on 30$^{th}$ May and 7$^{th}$ June. Assessment of plant height happened on 7$^{th}$ June, 14$^{th}$ June and 20$^{th}$ June.

Plant growth reduction of 13% was obtained on 7$^{th}$ June, 22% on 14$^{th}$ June and 20% on 20$^{th}$ June compared to untreated control.

The plants were all up to commercial standard, showed no phytotoxicity and no colour change compared to control.

Examples 50A-G: Other PGRs

Mixtures were prepared as detailed in Table 24. All mixtures were clear solutions.

TABLE 24

| # (active; acid:amide ratio) | Component | Wt. % |
|---|---|---|
| 50-A (6-BA; 1:6) | NBP | 62.80 |
| | Camphor sulfonic acid | 17.20 |
| | Atlox SCE | 10.00 |
| | 6-BAP | 10.00 |
| 50-B (6-BA; 1:8) | NBP | 66.40 |
| | Camphor sulfonic acid | 13.60 |
| | Atlox SCE | 10.00 |
| | 6-BAP | 10.00 |
| 50-C (S-ABA; 1:4) | NBP | 53.33 |
| | Ethephon | 15.22 |
| | S-ABA | 31.45 |
| 50-D (S-ABA; 1:4) | NBP | 48.28 |
| | Camphor sulfonic acid | 19.87 |
| | S-ABA | 31.85 |
| 50-E (Paclobutrazol; 1:6) | NBP | 58.88 |
| | Camphor sulfonic acid | 16.13 |
| | Paclobutrazol | 25.00 |
| 50-F (Paclobutrazol 1:8) | NBP | 62.25 |
| | Camphor sulfonic acid | 12.75 |
| | Paclobutrazol | 25.00 |
| 50-G (Prohexadione + Prothioconazole) | DMA | 64.74 |
| | Camphor sulfonic acid | 18.87 |
| | Prohexadione calcium | 5.45 |
| | Prothioconazole | 10.94 |

The invention has been described by reference to certain embodiments discussed above. It will be recognized that these embodiments are susceptible to various modifications and alternative forms well known to those of skill in the art without departing from the scope of the invention. Accordingly, although specific embodiments have been described, these are examples only and are not limiting upon the scope of the invention, which is defined in the accompanying claims.

The invention claimed is:

1. A liquid concentrate comprising dissolved prohexadione in a ionic liquid, the ionic liquid comprising an organic base and a strong acid, wherein the organic base is an amine, imine, amide, imide or urea, and wherein the strong acid has a pKa of below 4 and is able to form a ionic liquid with the organic base.

2. The liquid concentrate according to claim 1, wherein the prohexadione is a prohexadione-Ca salt.

3. The liquid concentrate according to claim 1, wherein the amount of prohexadione is about 3 wt % to about 20 wt %.

4. The liquid concentrate according to claim 1, wherein the composition further comprises further plant growth regulators, and/or, wherein the composition further comprises at least one fungicide, chosen from specific anti powdery mildew fungicides, SBI fungicides, Qol fungicides and SDHI fungicides.

5. The liquid concentrate according to claim 1, wherein the composition comprises ethephon as strong acid.

6. The liquid concentrate according to claim 5, wherein the composition comprises about 5 wt % to about 40 wt % of ethephon.

7. The liquid concentrate according to claim 5, wherein the relative weight amount of prohexadione salt to ethephon is in the range of 1:2 to 1:8.

8. A liquid concentrate comprising one or more dissolved plant growth regulators in an ionic liquid, the ionic liquid comprising an organic base and a strong acid, wherein said organic base is an amide, imide or urea and the molar ratio of acid to base is between about 1:2 to about 1:10.

9. The liquid concentrate according to claim 8 wherein said organic base is a tertiary amide.

10. The liquid concentrate according to claim 8, wherein the concentration of said one or more dissolved plant growth regulators is about 5 wt. % or higher.

11. The liquid concentrate according to claim 8, wherein said one or more dissolved plant growth regulators is one or more of a gibberellin, gibberellin derivative, S-ABA, chlormequat, ethephon, triazoles with growth regulation activity like metconazole and tebuconazole and the like, an auxin and/or at least one cytokinin.

12. The liquid concentrate according to claim 8, wherein said strong acid is camphor sulfonic acid and/or ethephon.

13. The liquid concentrate according to claim 1, wherein the concentrate further comprises an emulsifier and/or adjuvant.

14. The liquid concentrate claim 1, wherein the composition further comprises at least one of a further plant growth regulator, a fungicide, an antioxidant, a biocide, a metal compound, or another additive common in the art.

15. A method for treating plants with at least one plant growth regulator, wherein a water based spraying liquid is sprayed on plants in an amount of about 50 L to about 2500 L per hectare, wherein the water based spraying liquid comprises water and a suitable amount of the concentrate according to any one of the proceeding claims.

16. The method according to claim 15, wherein the plants are broad acre crop.

17. The method according to claim 15, wherein the plants are ornamental crops.

18. The method according to claim 15, wherein the water based spraying liquid comprises the concentrate in an amount such that the effective amount of the concentrate is about 50 mL up to about 20 L of said concentrate per hectare.

* * * * *